(12) United States Patent
Chen et al.

(10) Patent No.: US 11,712,928 B2
(45) Date of Patent: Aug. 1, 2023

(54) THREE-DIMENSIONAL TIRE SIPE

(71) Applicant: Bridgestone Americas Tire Operations, LLC, Nashville, TN (US)

(72) Inventors: Jean Y. Chen, Hudson, OH (US); Justin M. Gehres, Uniontown, OH (US); Domenic Giampaolo, Broadview Heights, OH (US); Neel K. Mani, Stow, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 109 days.

(21) Appl. No.: 16/320,578

(22) PCT Filed: Jul. 27, 2017

(86) PCT No.: PCT/US2017/044074
§ 371 (c)(1),
(2) Date: Jan. 25, 2019

(87) PCT Pub. No.: WO2018/022827
PCT Pub. Date: Feb. 1, 2018

(65) Prior Publication Data
US 2019/0160881 A1    May 30, 2019

Related U.S. Application Data

(60) Provisional application No. 62/367,143, filed on Jul. 27, 2016.

(51) Int. Cl.
*B60C 11/18* (2006.01)
*B60C 11/12* (2006.01)
*B60C 11/11* (2006.01)

(52) U.S. Cl.
CPC .......... *B60C 11/1218* (2013.01); *B60C 11/11* (2013.01); *B60C 11/12* (2013.01);
(Continued)

(58) Field of Classification Search
CPC ... B29C 64/112; B29C 41/006; B29C 64/329; B29C 64/106; B22F 3/1055
See application file for complete search history.

(56) References Cited

U.S. PATENT DOCUMENTS 6,026,875 A * 2/2000 Diensthuber ......... B60C 11/124
152/209.2
2005/0109438 A1 5/2005 Collette et al.
(Continued)

FOREIGN PATENT DOCUMENTS

JP 2002316517 A 10/2002
JP 2005104194 * 4/2005
(Continued)

OTHER PUBLICATIONS

Supplementary European Search Report, dated Jan. 30, 2020, in related European Patent Application No. EP17835244 filed Jul. 27, 2017, 3 pages.
(Continued)

*Primary Examiner* — Alison L Hindenlang
*Assistant Examiner* — Debjani Roy
(74) *Attorney, Agent, or Firm* — Shaun J. Fox; Thomas Y. Kendrick

(57) ABSTRACT

Various embodiments of a tire having a three-dimensional tire sipe are disclosed. In one embodiment, a tire sipe used in a tire is provided, the tire sipe comprising: a radially inner sipe taper portion having a radially inner sipe width W3 and a radially inner sipe transition width W4, wherein the radially inner sipe width W3 is greater than the radially inner sipe transition width W4; a radially outer sipe taper portion having a radially outer sipe width W1 and a radially outer sipe transition width W2, wherein the radially outer sipe width W1 is greater than the radially outer sipe transition width W2; and a sipe radially central portion having a plurality of individual sipe radially angled portions oriented
(Continued)

in a zig-zag pattern, wherein the sipe radially central portion is oriented radially between the radially inner sipe taper portion and the radially outer sipe taper portion.

19 Claims, 14 Drawing Sheets

(52) U.S. Cl.
CPC ...... *B60C 11/1259* (2013.01); *B60C 11/1272* (2013.01); *B60C 2011/1209* (2013.01); *B60C 2011/1213* (2013.01)

(56) References Cited

U.S. PATENT DOCUMENTS

| | | |
|---|---|---|
| 2005/0150581 A1 | 7/2005 | Kishida |
| 2007/0095447 A1 | 5/2007 | Nguyen et al. |
| 2011/0155293 A1* | 6/2011 | Berger ................ B60C 11/1218 |
| | | 152/209.24 |
| 2011/0290393 A1 | 12/2011 | Berger et al. |
| 2012/0132337 A1 | 5/2012 | Toulemont et al. |
| 2013/0133799 A1* | 5/2013 | Furusawa ............... B60C 11/11 |
| | | 152/209.21 |
| 2015/0013865 A1* | 1/2015 | Yoshikawa ......... B60C 11/1236 |
| | | 152/209.18 |
| 2015/0258860 A1 | 9/2015 | Sabetti et al. |

FOREIGN PATENT DOCUMENTS

| | | | |
|---|---|---|---|
| JP | 2007223493 | * | 9/2007 |
| WO | 2010132052 A1 | | 11/2010 |
| WO | 2016003435 A1 | | 1/2016 |

OTHER PUBLICATIONS

Machine English translation of Japanese Patent No. JP2002316517A, dated Feb. 6, 2020, 13 pages.

International Search Report, dated Oct. 25, 2017, in International Patent Application No. PCT/US2017/044074, filed on Jul. 27, 2017.

* cited by examiner

THREE-DIMENSIONAL TIRE SIPE

CROSS-REFERENCE TO RELATED APPLICATIONS

This application claims priority from U.S. Provisional Patent Application No. 62/367,143, filed on Jul. 27, 2016, which is incorporated by reference herein in its entirety.

BACKGROUND

Tires for use on vehicles may comprise a tread featuring sipes. The presence of sipes in a tire tread may create more surface edges to engage a roadway, which may increase traction in adverse road conditions. For example, a tire tread including sipes may perform better in icy, snowy, or wet road conditions than a tire tread not including sipes. Likewise, the more sipes a tire has, the better traction it may exhibit in adverse road conditions.

However, the addition of sipes to a tire tread block may reduce block stiffness, which may result in undesirable irregular wear patterns in the tire and a decrease in tire performance in dry road conditions (i.e., non-adverse conditions). Increasing the number of sipes in a tire tread block may relate to a decrease in stiffness of that tire tread block.

What is needed is a tire sipe configured to provide adequate traction in adverse road conditions, while maintaining the required stiffness for dry road conditions, and while resisting irregular wear patterns.

SUMMARY

In one embodiment, a tire sipe used in a tire is provided, the tire sipe comprising: a radially inner sipe taper portion having a radially inner sipe width W3 and a radially inner sipe transition width W4, wherein the radially inner sipe width W3 is greater than the radially inner sipe transition width W4; a radially outer sipe taper portion having a radially outer sipe width W1 and a radially outer sipe transition width W2, wherein the radially outer sipe width W1 is greater than the radially outer sipe transition width W2; and a sipe radially central portion having a plurality of individual sipe radially angled portions oriented in a zig-zag pattern, wherein the sipe radially central portion is oriented radially between the radially inner sipe taper portion and the radially outer sipe taper portion.

In another embodiment, a tire sipe used in a tire is provided, the tire sipe comprising: a radially inner sipe taper portion having a radially inner sipe width W3 and a radially inner sipe transition width W4, wherein the radially inner sipe width W3 is greater than the radially inner sipe transition width W4; and a sipe radially central portion having a plurality of individual sipe radially angled portions oriented in a zig-zag pattern, wherein the sipe radially central portion is oriented radially outwardly of the radially inner sipe taper portion.

In another embodiment, a tire sipe used in a tire is provided, the tire sipe comprising:
a radially outer sipe taper portion having a radially outer sipe width W1 and a radially outer sipe transition width W2, wherein the radially outer sipe width W1 is greater than the radially outer sipe transition width W2; and a sipe radially central portion having a plurality of individual sipe radially angled portions oriented in a zig-zag pattern, wherein the sipe radially central portion is oriented radially inwardly of the radially outer sipe taper portion.

BRIEF DESCRIPTION OF THE DRAWINGS

The accompanying figures, which are incorporated in and constitute a part of the specification, illustrate various example configurations, and are used merely to illustrate various example embodiments. In the figures, like elements bear like reference numerals.

DETAILED DESCRIPTION

Tires not intended for operation on smooth, dry surfaces typically comprise a tread pattern, including a least one groove, at least one rib, and/or a plurality of tread blocks. Tires intended for operation in inclement conditions, including for example icy or snowy conditions, may additionally comprise a plurality of sipes in the tire tread. The addition of sipes in the tire tread may result in more surface edges in the tire tread for engagement with the icy or snowy roadway.

Increasing the length of a sipe, such as orienting the sipe in a "zig-zag" pattern, may increase the amount of cutting edges available to engage snowy, icy, and/or wet road surfaces.

Orienting the sipe in a zig-zag pattern in at least one of the lateral direction of the tire and the radial direction of the tire, may allow opposing walls of the sipe to at least partially engage one another in a high friction, or locking, manner to maintain a desired stiffness of the tire tread block or tire tread rib. Maintaining a specified level of stiffness in the tire tread may mitigate or eliminate irregular wear patterns. Maintaining a specified level of stiffness in the tire tread may improve stopping distance of the tire. Maintaining a specified level of stiffness in the tire tread may improve traction of the tire.

Traditional sipes comprise substantially radially-oriented, narrow slits extending from a tread surface into the tread. These traditional sipes typically include straight, parallel walls.

Figure 1:
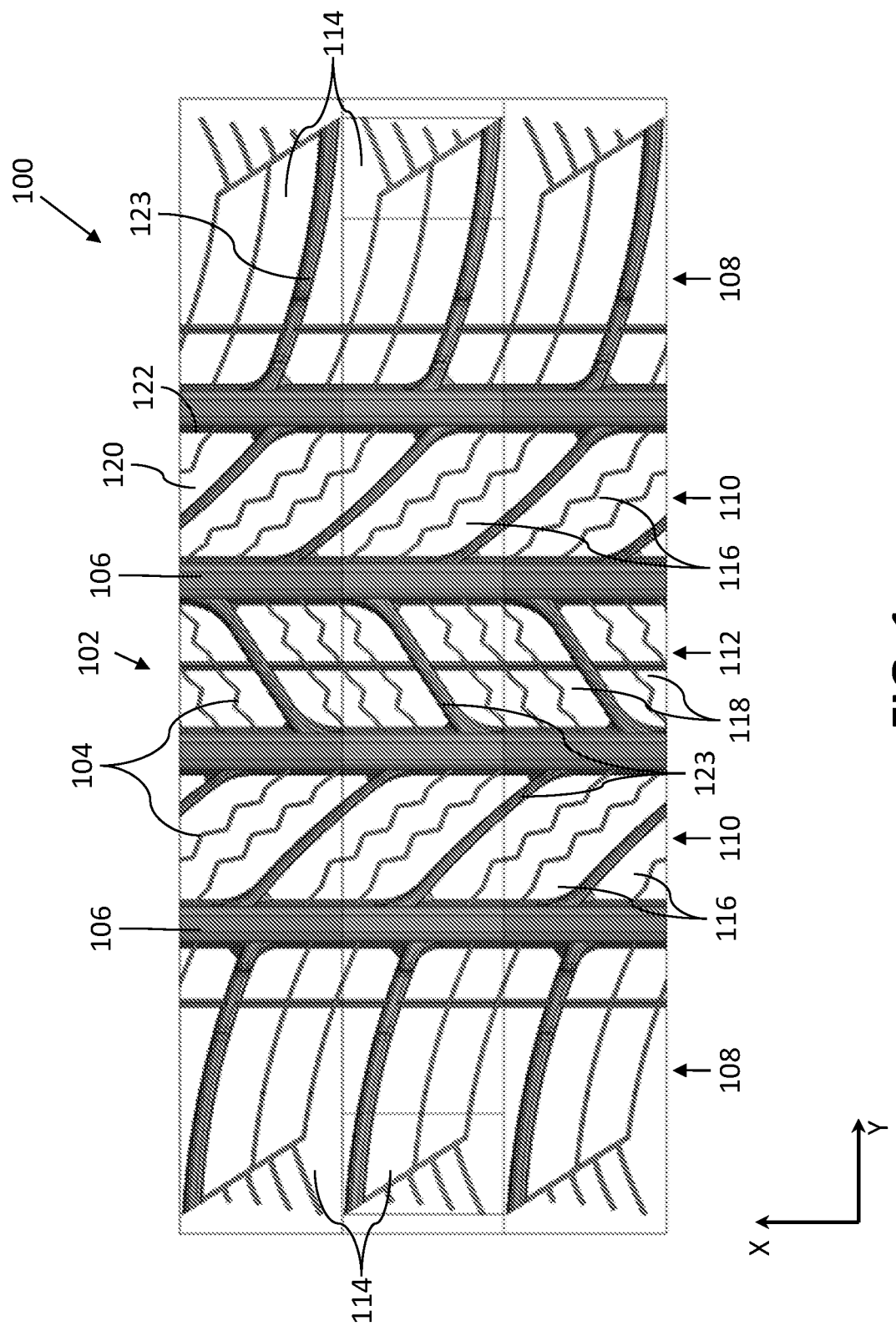
FIG. 1 illustrates a plan view of an example embodiment of a tire tread 100 having a three-dimensional tire sipe.

FIG. 1 illustrates a plan view of an example embodiment of a tire tread 100 having at least one three-dimensional tire sipe 104. Tire tread 100 may include a plurality of tire tread blocks 102. At least one of the plurality of tire tread blocks 102 may include at least one tire sipe 104.

Tire tread 100 may include at least one groove 106. At least one groove 106 may be a circumferential groove. At least one groove 106 may be a groove inclined relative to the circumferential direction (as indicated by the X-axis as identified in FIG. 1) and/or to a centerline of tire tread 100. At least one groove 106 may be a groove substantially parallel to a centerline of tire tread 100. At least one groove 106 may be oriented substantially longitudinally. At least one groove 106 may include a plurality of grooves oriented substantially circumferentially, substantially parallel to a centerline of a tire tread, inclined relative to the circumferential direction, or a combination of two or more thereof.

Tire tread 100 may include at least one shoulder rib 108. Tire tread 100 may include at least one intermediate rib 110. Tire tread 100 may include at least one center rib 112. At least two of shoulder rib 108, intermediate rib 110, and center rib 112 may be separated by at least one groove 106. Shoulder rib 108, intermediate rib 110, and center rib 112 may each comprise a plurality of distinct tread blocks. Shoulder rib 108, intermediate rib 110, and center rib 112 may each be solid ribs, not including distinct tread blocks. Alternatively, a least one of shoulder rib 108, intermediate rib 110, and center rib 112 may comprise a plurality of distinct tread blocks, while at least one of shoulder rib 108, intermediate rib 110, and center rib 112 may be a solid rib, not including distinct tread blocks. While FIG. 1 illustrates two shoulder ribs 108, and two intermediate ribs 110, it is understood that the two shoulder ribs 108 and/or the two intermediate ribs 110 may be different from one another, respectively. While FIG. 1 illustrates two shoulder ribs 108, two intermediate ribs 110, and one center rib 112, it is understood that this is an example tire tread 100, and that tire tread 100 may include more or less ribs.

Shoulder rib 108 may comprise a plurality of shoulder blocks 114. Intermediate rib 110 may include a plurality of intermediate blocks 116. Center rib 112 may include a plurality of center blocks 118. Shoulder blocks 114, intermediate blocks 116, and center blocks 118 may make up tire tread blocks 102. Any of shoulder blocks 114, intermediate blocks 116, and center blocks 118 may be distinct tread blocks. Any of shoulder blocks 114, intermediate blocks 116, and center blocks 118 may be distinct tread blocks separated by at least one transverse groove 123.

At least one transverse groove 123 may be inclined relative to the axial direction (as indicated by the Y-axis as identified in FIG. 1). At least one transverse groove 123 may be substantially parallel to the axial direction. At least one transverse groove 123 may be inclined relative to the circumferential direction (as indicated by the X-axis as identified in FIG. 1). At least one transverse groove 123 may connect to at least one groove 106. At least one transverse groove 123 may, in some instances, extend between two or more grooves 106.

Tire tread blocks 102 may include a radially outermost block surface 120. Block surface 120 may include a road contact surface, which may be that surface of tire tread block 102 that contacts a road surface during operation of a tire incorporating tire tread 100. At least one tire sipe 104 may extend into tire tread block 102 from block surface 120.

Tire tread blocks 102 may include at least one block sidewall 122. At least one block sidewall 122 may be oriented substantially parallel to the radial direction of the tire. At least one block sidewall 122 may be inclined relative to the radial direction of the tire. At least one block sidewall 122 may be oriented at or near at least one groove 106, at least one transverse groove 123, or a combination thereof.

At least one tire sipe 104 may open into at least one groove 106. At least one tire sipe 104 may open into at least one transverse groove 123. At least one tire sipe 104 may open into at least one of groove 106 and transverse groove 123.

Figure 2:
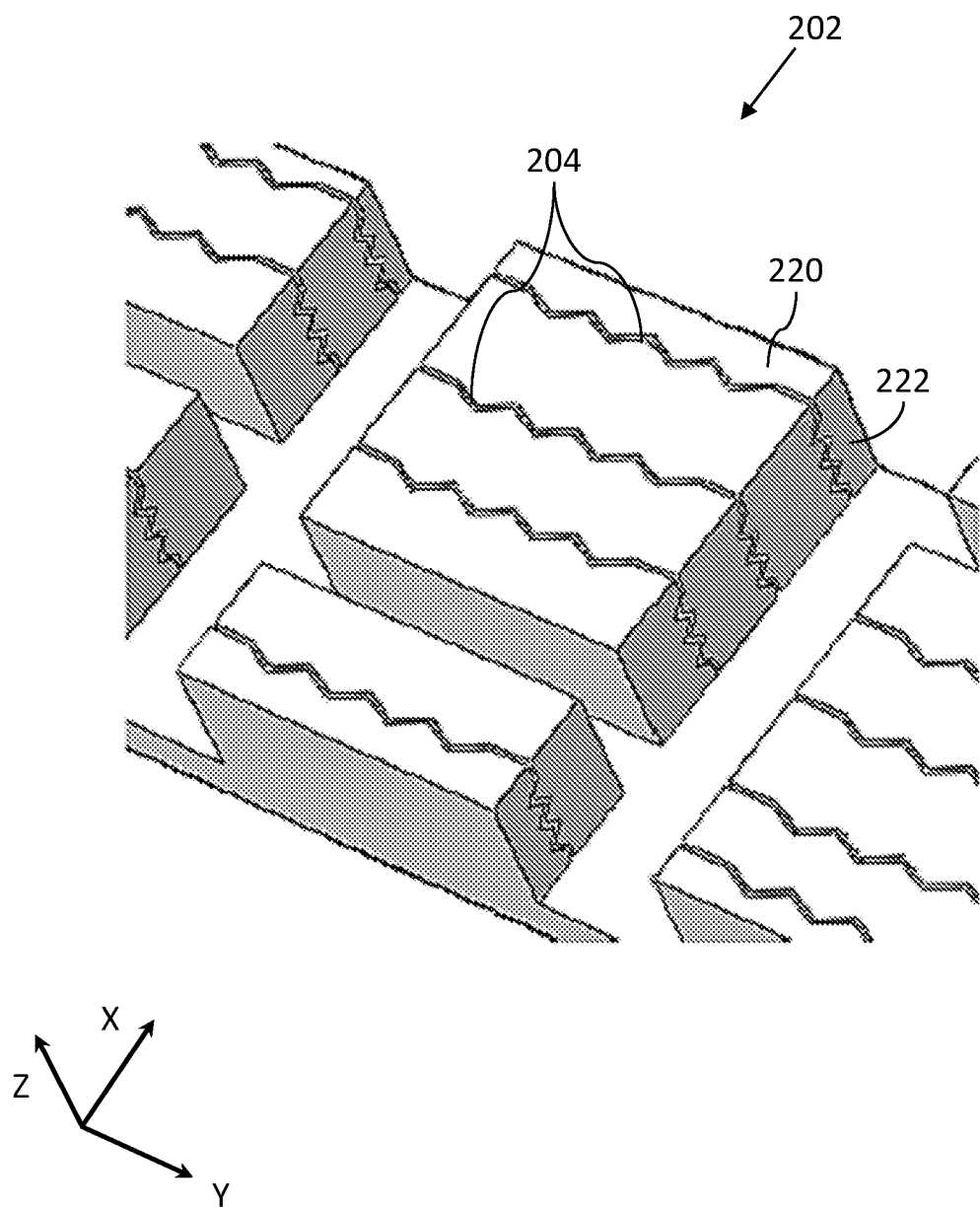
FIG. 2 illustrates a perspective view of an example embodiment of a tire tread block 202 having a three-dimensional tire sipe.

FIG. 2 illustrates an example embodiment of a tire tread block 202 having at least one three-dimensional tire sipe 204. Tire tread blocks 202 may have a radially outermost block surface 220. Tire tread blocks 202 may have at least one block sidewall 222.

Tire sipe 204 may extend into tire tread block 202 from block surface 220. Tire sipe 204 may extend into tire tread block 202 from at least one block sidewall 222. Tire sipe 204 may extend into tire tread block 202 from both block surface 220 and at least one block sidewall 222. Tire sipe 204 may extend into tire tread block 202 from at least one of block surface 220 and block sidewall 222. It is understood that tire sipe 204 extending into tire tread block 202 from at least one of block surface 220 and block sidewall 222 means that tire sipe 204 opens into at least one of block surface 220 and block sidewall 222.

Tire sipe 204 may have a substantially zig-zag shape at its intersection with at least one of block surface 220 and block sidewall 222. Tire sipe 204 may have a substantially zig-zag shape at its intersection with both of block surface 220 and block sidewall 222.

As illustrated in FIG. 2, the X-axis may represent a circumferential direction, while the Y-axis may represent an axial direction, while the Z-axis may represent a radial direction.

Figure 3:
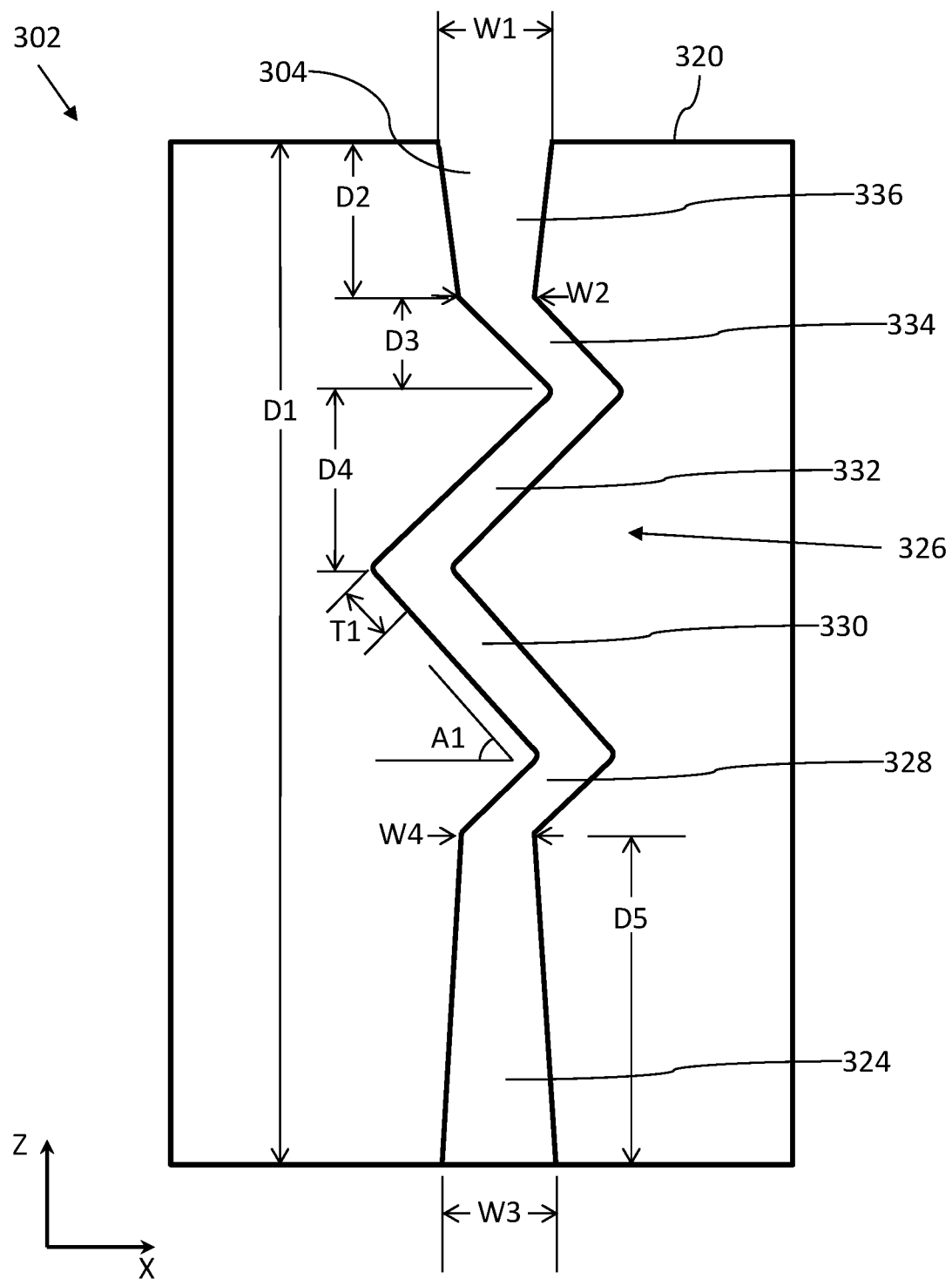
FIG. 3 illustrates a sectional view of an example embodiment of a tire tread block 302 having a three-dimensional tire sipe.

FIG. 3 illustrates a sectional view of an example embodiment of a tire tread block 302 having a three-dimensional tire sipe 304. Tread block 302 may include a radially outermost block surface 320. Tire sipe 304 may open into block surface 320. Block surface 320 may be a road contact surface. As such, tire sipe 304 may be in contact with a road surface. Tire sipe 304 may be operatively connected to a road surface. Tire sipe 304 may engage a road surface. Tire sipe 304 may be operatively connected with an element on a road surface, including for example a liquid such as water, or a solid such as snow or ice.

Tire sipe 304 may include a radially inner sipe taper portion 324. Radially inner sipe taper portion 324 may include a tapered void that decreases in width as it progresses radially. Radially inner sipe taper portion 324 may include a greater width at its radially innermost portion, and a lesser width at its radially outermost portion. Radially inner sipe taper portion 324 may include a radially inner sipe width W3, and a radially inner sipe transition width W4. Width W3 may be greater than width W4, such that radially inner sipe taper portion 324 tapers in toward itself as it extends radially outwardly.

In one embodiment, width W3 may be about 0.60 mm, while width W4 may be about 0.42 mm. In one embodiment, width W3 and W4 may be any of a variety of widths, as may be desired in any of various designs of tire sipe 304.

In one embodiment, width W3 may be between about 0.54 mm and about 0.66 mm. In another embodiment, width W3 may be between about 0.48 mm and about 0.72 mm. In another embodiment, width W3 may be between about 0.42 mm and about 0.78 mm. In another embodiment, width W3 may have a range comprising the lower and upper limits of any of the various ranges recited above, for example, a range between about 0.48 mm and about 0.78 mm.

In one embodiment, width W4 may be between about 0.38 mm and about 0.46 mm. In another embodiment, width W4 may be between about 0.33 mm and about 0.50 mm. In another embodiment, width W4 may be between about 0.29 mm and about 0.55 mm. In another embodiment, width W4 may have a range comprising the lower and upper limits of any of the various ranges recited above, for example, a range between about 0.33 mm and about 0.55 mm.

Width W4 may be about 70% of width W3. Width W3 may be about 143% of width W4. In one embodiment, width W4 may be between about 65% and about 75% of width W3. In another embodiment, width W4 may be between about 60% and about 80% of width W3. In another embodiment, width W4 may be between about 55% and about 85% of width W3. In another embodiment, width W4 may be between about 60% and about 70% of width W3. In another embodiment, width W4 may be between about 70% and about 80% of width W3. In another embodiment, width W4 may be a percentage of width W3 within a range comprising the lower and upper limits of the various ranges recited above, for example, a range between about 60% and about 70%.

Radially inner sipe taper portion 324 may include widths W3 and W4 that are configured to provide adequate passageway in the base of tire sipe 304 to increase a flow of a liquid along the base of tire sipe 304. That is, widths W3 and W4 may be selected to permit a desired flow of a liquid such as water through the base (radially innermost portion) of tire sipe 304. Radially inner sipe taper portion 324 may include widths W3 and W4 that are configured to increase strength and/or stiffness of a sipe blade used to mold tire sipe 304.

Tire sipe 304 may include a depth D1, measured in a radial direction (illustrated as the Z-axis). Depth D1 may be about 6.60 mm. In one embodiment, depth D1 may be any of a variety of depths, as may be desired in any of various designs of tire sipe 304. Radially inner sipe taper portion 324 may have a depth D5. Depth D5 may be about 2.60 mm. In one embodiment, depth D5 may be any of a variety of depths, as may be desired in any of various designs of tire sipe 304. Depth D5 may be about 40% of depth D1. In one embodiment, depth D5 may be between about 35% and about 45% of depth D1. In another embodiment, depth D5 may be between about 30% and about 50% of depth D1. In another embodiment, depth D5 may be between about 25% and about 55% of depth D1. In another embodiment, depth D5 may be a percentage of depth D1 within a range comprising the lower and upper limits of any of the various ranges recited above, for example, a range between about 35% and about 55%.

Tire sipe 304 may have a depth D1 that extends radially inwardly to a wear bar of the tire. Tire sipe 304 may have a depth D1 that extends radially inwardly to a wear bar of the tire to maintain sipe edge density count through the entire recommend service life of a tire (based on tread wear) having tire sipe 304. Maintaining sipe edge density count through the entire life of the tire having tire sipe 304 may maintain at least one of snow performance and wet performance, for the entire recommended service life of the tire (based on tread wear).

Tire sipe 304 may include a sipe radially central portion 326. Central portion 326 may include a plurality of individual sipe radially angled portions, including for example, a first sipe radially angled portion 328, a second sipe radially angled portion 330, a third sipe radially angled portion 332, and a fourth sipe radially angled portion 334. Central portion 326 may be comprised of a plurality of individual angled portions oriented in a zig-zag pattern.

First angled portion 328 may extend from the radially outermost portion of sipe taper portion 324, to the radially innermost portion of second angled portion 330. Second angled portion 330 may extend from the radially outermost portion of first angled portion 328 to the radially innermost portion of third angled portion 332. Third angled portion 332 may extend from the radially outermost portion of second angled portion 330 to the radially innermost portion of fourth angled portion 334. Fourth angled portion 334 may extend from the radially outermost portion of third angled portion 332 to the radially innermost portion of a radially outer sipe taper portion 336.

Each of first angled portion 328, second angled portion 330, third angled portion 332, and fourth angled portion 334 may be oriented at an angle A1 relative to the circumferential direction (illustrated by the X-axis). Angle A1 may be any of a variety of angles as may be desired in any of various designs of tire sipe 304. In one embodiment, angle A1 may be about 45 degrees. In another embodiment, angle A1 may be between about 40 degrees and about 50 degrees. In another embodiment, angle A1 may be between about 36 degrees and about 54 degrees. In another embodiment, angle A1 may be between about 31 degrees and about 59 degrees. In another embodiment, angle A1 may include a range comprising the lower and upper limits of any of the various ranges recited above, for example, a range between about 36 degrees and about 59 degrees.

Sipe radially central portion 326 may include a thickness T1. Thickness T1 may be any of a variety of thicknesses as may be desired in any of a various designs of tire sipe 304. In one embodiment, thickness T1 may be about 0.30 mm. In another embodiment, thickness T1 may be between about 0.25 mm and about 0.35 mm. In another embodiment, thickness T1 may be between about 0.20 mm and about 0.40 mm. In another embodiment, thickness T1 may be between about 0.15 mm and about 0.45 mm. In another embodiment, thickness T1 may include a range comprising the lower and upper limits of any of the various ranges recited above, for example, a range between about 0.25 mm and about 0.40 mm.

In one embodiment, A1 is about 45 degrees. An angle A1 of about 45 degrees may create a desired interlocking stiffness, such that a tread block 302 on a first side of tire sipe 304 engages the corresponding elements of tread block 302 on a second side of tire sipe 304. In one embodiment, a thickness T1 of about 0.30 mm may create a desired interlocking stiffness. In another embodiment, an angle A1 of about 45 degrees and a thickness T1 of about 0.30 mm may create a desired interlocking stiffness between opposite sides of tread block 302 on either side of tire sipe 304. A desired interlocking stiffness may be that stiffness that provides at least one of a desired braking performance, a desired tractive performance, a desired wear performance, and a desired maneuvering performance. The zig-zag shape of tire sipe 304 (in a radial direction) may generate an optimal interlocking stiffness.

First angled portion 328 and fourth angled portion 334 may include a radial depth D3. Depth D3 may be any of a variety of depths as may be desired in any of various designs of tire sipe 304. In one embodiment, depth D3 may be about 0.50 mm. In another embodiment, depth D3 may be between about 0.45 mm and about 0.55 mm. In another embodiment, depth D3 may be between about 0.40 mm and about 0.60 mm. In another embodiment, depth D3 may be between about 0.35 mm and about 0.65 mm. In another embodiment, depth D3 may include a range comprising the lower and upper limits of any of the various ranges recited above, for example, a range between about 0.45 mm and about 0.60 mm.

Second angled portion 330 and third angled portion 332 may include a radial depth D4. Depth D4 may be any of a variety of depths as may be desired in any of various designs of tire sipe 304. In one embodiment, depth D4 may be about 1.00 mm. In another embodiment, depth D4 may be between about 0.90 mm and about 1.10 mm. In another embodiment, depth D4 may be between about 0.80 mm and about 1.20 mm. In another embodiment, depth D4 may be between about 0.70 mm and about 1.30 mm. In another embodiment, depth D4 may include a range comprising the lower and upper limits of any of the various ranges recited above, for example, a range between about 0.90 mm and about 1.20 mm.

Tire sipe 304 may include radially outer sipe taper portion 336. Radially outer sipe taper portion 336 may include a tapered void that increases in width as it progresses radially. Radially outer sipe taper portion 336 may include a lesser width at its radially innermost portion, and a greater width at its radially outermost portion. Radially outer sipe taper portion 336 may include a radially outer sipe width W1, and a radially outer sipe transition width W2. Width W1 may be greater than width W2, such that radially outer sipe taper portion 336 tapers out away from itself as it extends radially outwardly.

In one embodiment, width W1 may be about 0.60 mm, while width W2 may be about 0.42 mm. In one embodiment, width W1 and W2 may be any of a variety of widths, as may be desired in any of various designs of tire sipe 304.

In one embodiment, width W1 may be between about 0.54 mm and about 0.66 mm. In another embodiment, width W1 may be between about 0.48 mm and about 0.72 mm. In another embodiment, width W1 may be between about 0.42 mm and about 0.78 mm. In another embodiment, width W1 may have a range comprising the lower and upper limits of any of the various ranges recited above, for example, a range between about 0.48 mm and about 0.78 mm.

In one embodiment, width W2 may be between about 0.38 mm and about 0.46 mm. In another embodiment, width W2 may be between about 0.33 mm and about 0.50 mm. In another embodiment, width W2 may be between about 0.29 mm and about 0.55 mm. In another embodiment, width W2 may have a range comprising the lower and upper limits of any of the various ranges recited above, for example, a range between about 0.33 mm and about 0.55 mm.

Width W2 may be about 70% of width W1. Width W1 may be about 143% of width W2. In one embodiment, width W2 may be between about 65% and about 75% of width W1. In another embodiment, width W2 may be between about 60% and about 80% of width W1. In another embodiment, width W2 may be between about 55% and about 85% of width W1. In another embodiment, width W2 may be between about 60% and about 70% of width W1. In another embodiment, width W2 may be between about 70% and about 80% of width W1. In another embodiment, width W2 may be a percentage of width W1 within a range comprising the lower and upper limits of the various ranges recited above, for example, a range between about 60% and about 70%.

Radially outer sipe taper portion 336 may have a depth D2. Depth D2 may be about 1.00 mm. In one embodiment, depth D2 may be any of a variety of depths, as may be desired in any of various designs of tire sipe 304. Depth D2 may be about 15% of depth D1. In one embodiment, depth D2 may be between about 10% and about 20% of depth D1. In another embodiment, depth D2 may be between about 5% and about 25% of depth D1. In another embodiment, depth D2 may be between about 2.5% and about 30% of depth D1. In another embodiment, depth D2 may be a percentage of depth D1 within a range comprising the lower and upper limits of any of the various ranges recited above, for example, a range between about 5% and about 30%.

Radially outer sipe taper portion 336 may include widths W1 and W2 that are configured to provide adequate opening in tire sipe 304 for at least one of snow performance and wet performance. That is, widths W1 and W2 may be selected to permit a desired amount of snow and/or water to enter tire sipe 304. Radially outer sipe taper portion 336 may include widths W1 and W2 that are configured to increase strength and/or stiffness of a sipe blade used to mold tire sipe 304.

Widths W1, W2, W3, and W4 may be measured substantially transversely (along the X-axis in FIG. 3) to the longitudinal direction of tire sipe 304. For example, where tire sipe 304 extends in an axial direction, widths W1, W2, W3, and W4 may be measured along the circumferential direction.

Figure 4:
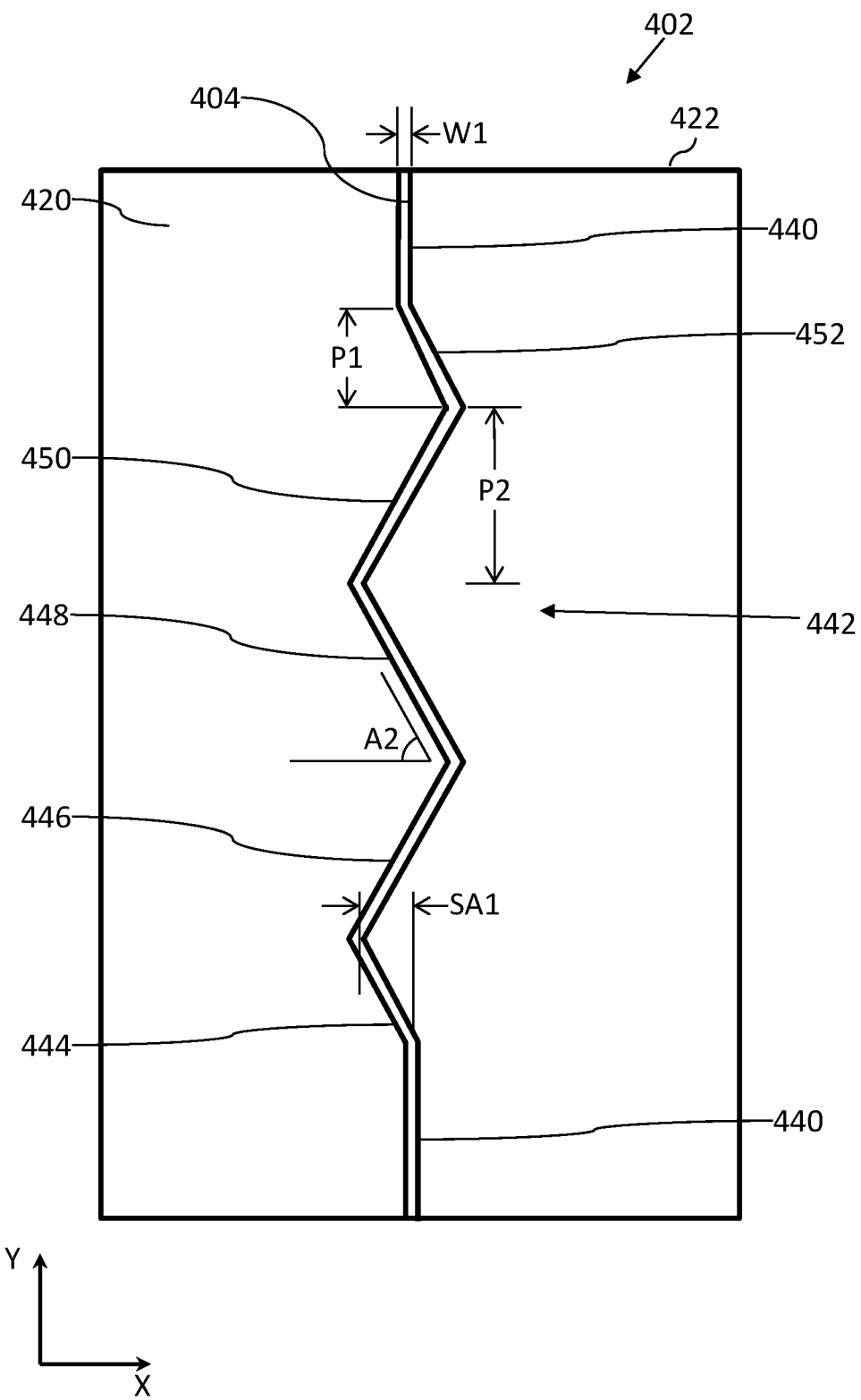
FIG. 4 illustrates an elevational view of an example embodiment of a tire tread block 402 having a three-dimensional tire sipe.

FIG. 4 illustrates an elevational view of an example embodiment of a tire tread block 402 having a three-dimensional tire sipe 404. Tread block 402 may have a radially outermost portion 420. Tread block 402 may have a block sidewall 422.

Tire sipe 404 may include at least one laterally outermost sipe portion 440. Laterally outermost sipe portion 440 may extend from at least one block sidewall 422. Laterally outermost sipe portion 440 may be substantially planar. Laterally outermost sipe portion 440 may be substantially parallel to the longitudinal axis of tire sipe 404.

Tire sipe 404 may include a sipe laterally central portion 442. Sipe laterally central portion 442 may be oriented laterally between a pair of lateral outermost sipe portions 440. Sipe laterally central portion 442 may comprise a zig-zag orientation. For example, sipe laterally central portion 442 may comprise a plurality of angled portions, including for example, a first sipe laterally angled portion 444, a second sipe laterally angled portion 446, a third sipe laterally angled portion 448, a fourth sipe laterally angled portion 450, and a fifth sipe laterally angled portion 452.

Each angled portion of sipe laterally central portion 442 as described above (first sipe laterally angled portion 444, second sipe laterally angled portion 446, third sipe laterally angled portion 448, fourth sipe laterally angled portion 450, and fifth sipe laterally angled portion 452) may be oriented at an angle A2 relative to the lateral axis of tire sipe 404. For example, where tire sipe 404 is oriented in the axial direction (illustrated by the Y-axis), angle A2 would be measured from the circumferential direction (illustrated by the X-axis). Where tire sipe 404 is inclined relative to the circumferential direction of the tire, angle A2 is measured relative to the circumferential direction (illustrated by the X-axis), while adding or subtracting (depending upon which angled portion is being measured) the angle of tire sipe 404's inclination.

Angle A2 may be any of a variety of angles as may be desired in any of various designs of tire sipe 404. In one embodiment, angle A2 may be about 31 degrees. In another embodiment, angle A2 may be between about 26 degrees and about 36 degrees. In another embodiment, angle A2 may be between about 21 degrees and about 41 degrees. In another embodiment, angle A2 may be between about 16 degrees and about 46 degrees. In another embodiment, angle A2 may include a range comprising the lower and upper limits of any of the various ranges recited above, for example, a range between about 21 degrees and about 46 degrees.

Tire sipe 404 may include a radially outer sipe width W1 at radially outermost block surface 420. Width W1 may be the same as width W1 described above with respect to FIG. 3.

First sipe laterally angled portion 444 and fifth sipe laterally angled portion 452 may have a lateral magnitude P1 measured along the longitudinal axis of sipe 404. Lateral magnitude P1 may be any of a variety of lengths as may be desired in any of various designs of tire sipe 404. In one embodiment, lateral magnitude P1 may be about 2.00 mm. In another embodiment, lateral magnitude P1 may be between about 1.80 mm and about 2.20 mm. In another embodiment, lateral magnitude P1 may be between about 1.60 mm and about 2.40 mm. In another embodiment, lateral magnitude P1 may be between about 1.40 mm and about 2.60 mm. In another embodiment, lateral magnitude P1 may include a range comprising the lower and upper limits of any of the various ranges recited above, for example, a range between about 1.60 mm and about 2.60 mm.

At least one of third sipe laterally angled portion 448, fourth sipe laterally angled portion 450, and fifth sipe laterally angled portion 452 may have an angled lateral magnitude P2 measured along the longitudinal axis of sipe 404. Angled lateral magnitude P2 may be any of a variety of lengths as may be desired in any of various designs of tire sipe 404. In one embodiment, angled lateral magnitude P2 may be about 4.00 mm. In another embodiment, angled lateral magnitude P2 may be between about 3.60 mm and about 4.40 mm. In another embodiment, angled lateral magnitude P2 may be between about 3.20 mm and about 4.8 mm. In another embodiment, angled lateral magnitude P2 may be between about 2.80 mm and about 5.20 mm. In another embodiment, angled lateral magnitude P2 may include a range comprising the lower and upper limits of any of the various ranges recited above, for example, a range between about 3.60 mm and about 5.20 mm.

Each angled portion of sipe laterally central portion 442 may include a laterally angled portion amplitude SA1. Laterally angled portion amplitude SA1 may be measured in a substantially lateral direction of tire sipe 404. For example, where tire sipe 404 is oriented along the axial direction (Y-axis), then laterally angled portion amplitude SA1 may be measured in a circumferential direction (X-axis). Laterally angled portion amplitude SA1 may be any of a variety of lengths as may be desired in any of various designs of tire sipe 404. In one embodiment, laterally angled portion amplitude SA1 may be about 1.20 mm. In another embodiment, laterally angled portion amplitude SA1 may be between about 1.08 mm and about 1.32 mm. In another embodiment, laterally angled portion amplitude SA1 may be between about 0.96 mm and about 1.44 mm. In another embodiment, laterally angled portion amplitude SA1 may be between about 0.84 mm and about 1.56 mm. In another embodiment, laterally angled portion amplitude SA1 may include a range comprising the lower and upper limits of any of the various ranges recited above, for example, a range between about 0.96 mm and about 1.56 mm.

Figure 5:
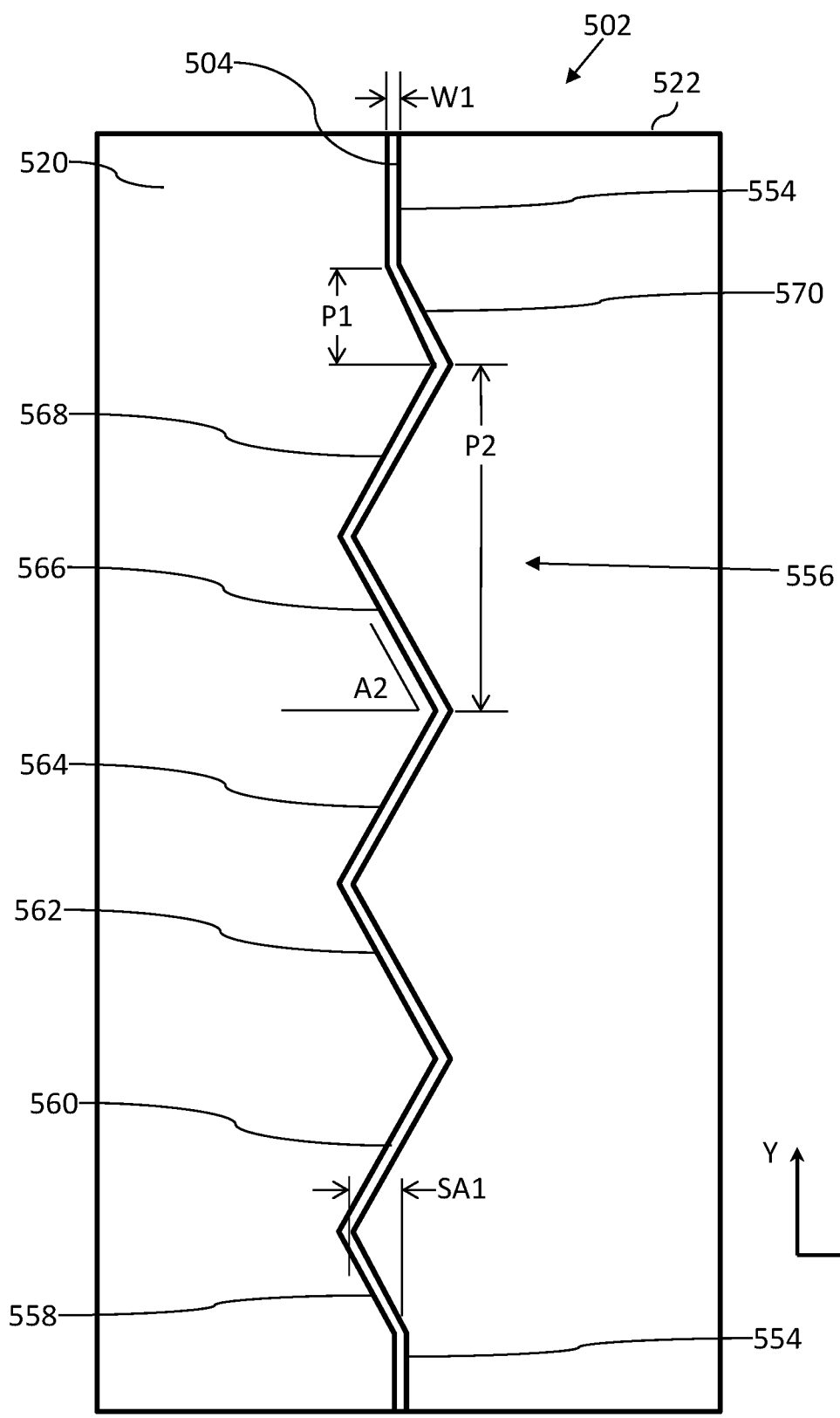
FIG. 5 illustrates an elevational view of an example embodiment of a tire tread block 502 having a three-dimensional tire sipe.

FIG. 5 illustrates an elevational view of an example embodiment of a tire tread block 502 having a three-dimensional tire sipe 504. Tread block 502 may have a radially outermost portion 520. Tread block 502 may have a block sidewall 522.

Tire sipe 504 may include at least one laterally outermost sipe portion 554. Laterally outermost sipe portion 554 may extend from at least one block sidewall 522. Laterally outermost sipe portion 554 may be substantially planar. Laterally outermost sipe portion 554 may be substantially parallel to the longitudinal axis of tire sipe 504.

Tire sipe 504 may include a sipe laterally central portion 556. Sipe laterally central portion 556 may be oriented laterally between a pair of lateral outermost sipe portions 554. Sipe laterally central portion 556 may comprise a zig-zag orientation. For example, sipe laterally central portion 556 may comprise a plurality of angled portions, including for example, a first sipe laterally angled portion 558, a second sipe laterally angled portion 560, a third sipe laterally angled portion 562, a fourth sipe laterally angled portion 564, a fifth sipe laterally angled portion 566, a sixth sipe laterally angled portion 568, and a seventh sipe laterally angled portion 570. Tire sipe 504 may be substantially similar to tire sipe 404 described above in relation to FIG. 4, with the exception that tire sipe 504 may include sixth and seventh laterally angled sipe portions (568 and 570).

Each angled portion of sipe laterally central portion 556 as described above (first sipe laterally angled portion 558, second sipe laterally angled portion 560, third sipe laterally angled portion 562, fourth sipe laterally angled portion 564, fifth sipe laterally angled portion 566, sixth sipe laterally angled portion 568, and seventh sipe laterally angled portion 570) may be oriented at an angle A2 relative to the lateral axis of tire sipe 504. For example, where tire sipe 504 is oriented in the axial direction (illustrated by the Y-axis), angle A2 would be measured from the circumferential direction (illustrated by the X-axis). Where tire sipe 504 is inclined relative to the circumferential direction of the tire, angle A2 is measured relative to the circumferential direction (illustrated by the X-axis), while adding or subtracting (depending upon which angled portion is being measured) the angle of tire sipe 504's inclination. Angle A2 may have the same angles recited above with respect to angle A2 illustrated in FIG. 4.

Tire sipe 504 may include a radially outer sipe width W1 at radially outermost block surface 520. Width W1 may be the same as width W1 described above with respect to FIG. 3.

First sipe laterally angled portion 558 and seventh sipe laterally angled portion 570 may have a lateral magnitude P1 measured along the longitudinal axis of sipe 504. Lateral magnitude P1 may be any of a variety of lengths as may be desired in any of various designs of tire sipe 504. In one embodiment, lateral magnitude P1 may include the same values as described above with respect to lateral magnitude P1 in tire sipe 404 of FIG. 4.

At least one of third sipe laterally angled portion 562, fourth sipe laterally angled portion 564, fifth sipe laterally angled portion 566, sixth sipe laterally angled portion 568, and seventh sipe laterally angled portion 570 may have an angled lateral magnitude P2 measured along the longitudinal axis of sipe 504. In one embodiment, angled lateral magnitude P2 may include the same values as described above with respect to angled lateral magnitude P2 in tire sipe 404 of FIG. 4.

Each angled portion of sipe laterally central portion 556 may include a laterally angled portion amplitude SA1. Laterally angled portion amplitude SA1 may be measured in a substantially lateral direction of tire sipe 504. For example, where tire sipe 504 is oriented along the axial direction (Y-axis), then laterally angled portion amplitude SA1 may be measured in a circumferential direction (X-axis). Laterally angled portion amplitude SA1 may be any of a variety of lengths as may be desired in any of various designs of tire sipe 504. In one embodiment, laterally angled portion amplitude SA1 may include the same values as described above with respect to laterally angled portion amplitude SA1 in tire sipe 404 of FIG. 4.

In one embodiment, tire sipes 404 and 504 illustrated in FIGS. 4 and 5 may include a zig-zag shape opening into radially outermost block surface 420 and 520. The zig-zag shape of tire sipes 404 and 504 may allow more cutting edges in tread blocks 402 and 502. More cutting edges may increase at least one of snow performance and wet performance of a tire including tire sipes 404 and 504. These additional cutting edges may exist in tread blocks 402 and 502 while maintaining required stiffness of tread blocks 402 and 502 for at least one of dry performance and wear performance.

Figure 6:
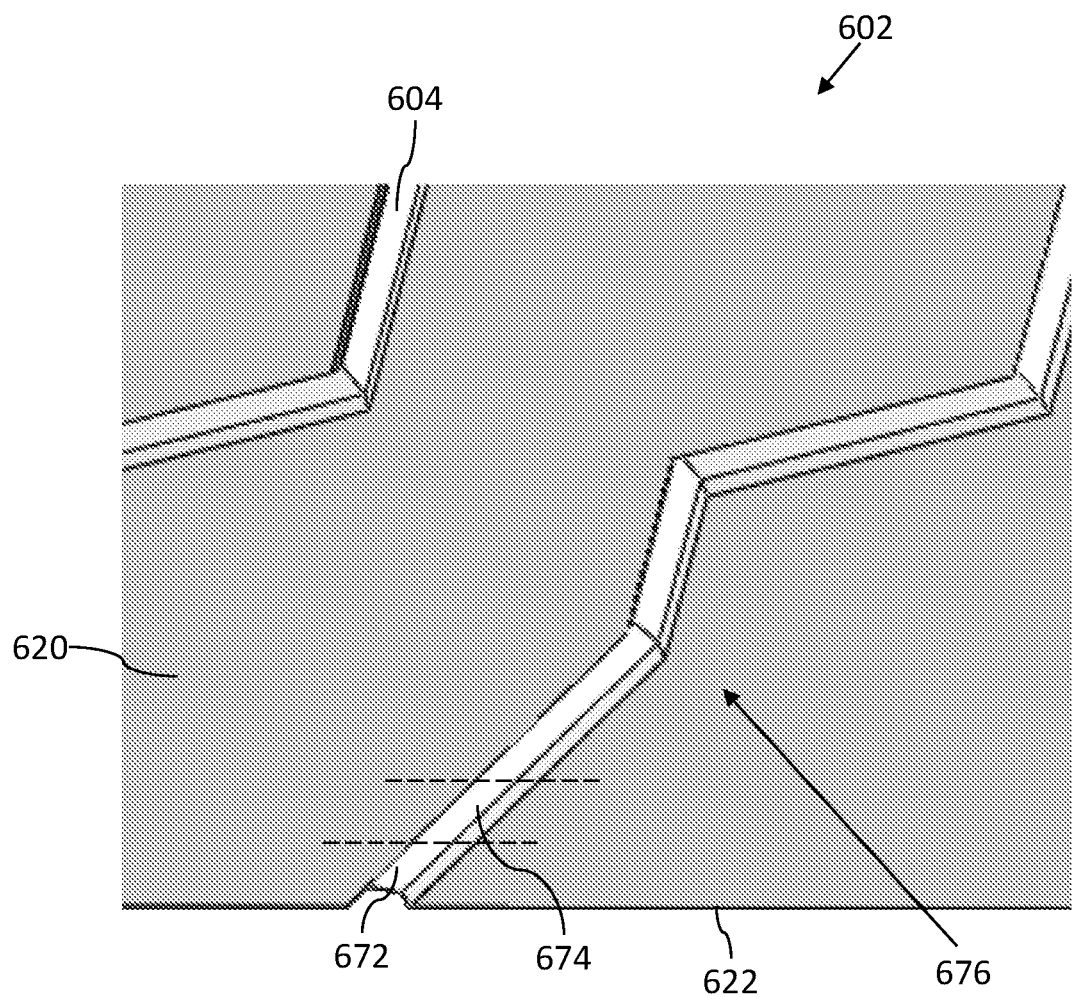
FIG. 6 illustrates a partial perspective view of an example embodiment of a tire tread block 602 having a three-dimensional tire sipe.
Figure 7A:
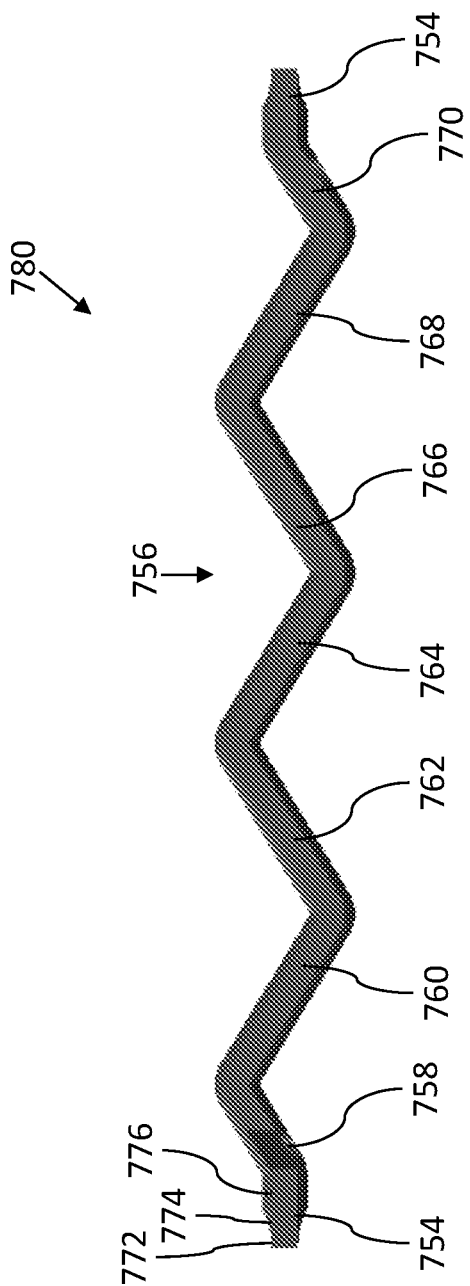
FIG. 7A illustrates a plan view of an example embodiment of a tire sipe blade 780 for molding a three-dimensional tire sipe.
Figure 7B:
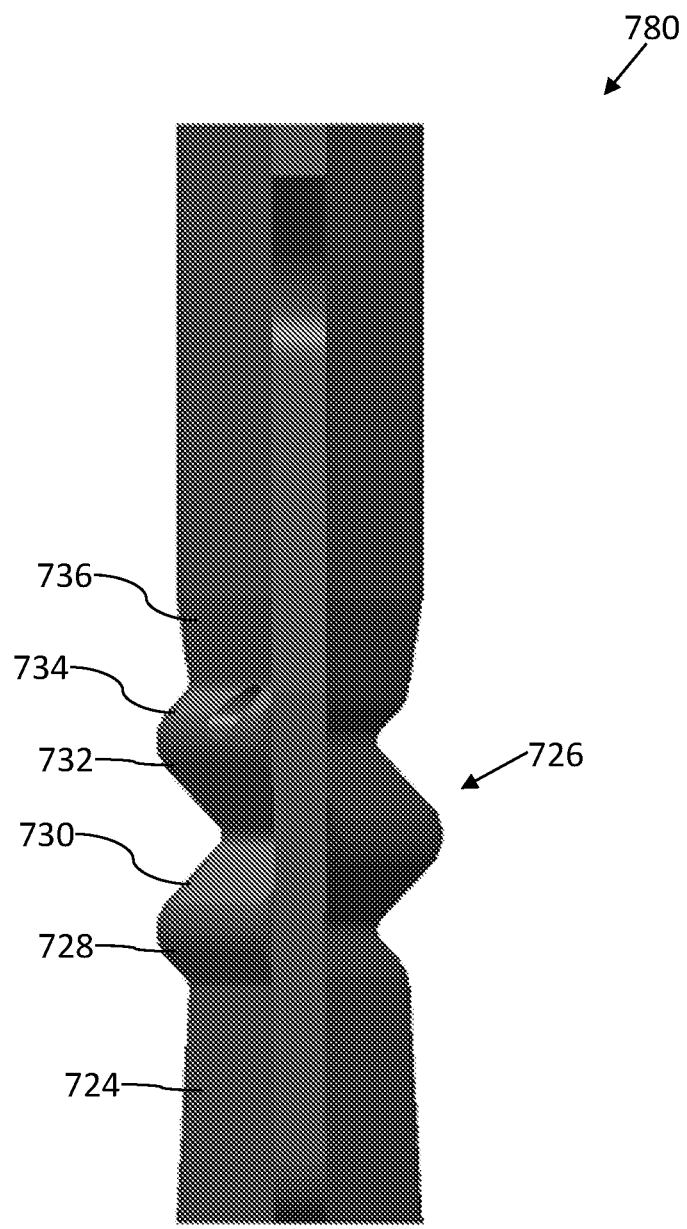
FIG. 7B illustrates a side elevational view of an example embodiment of tire sipe blade 780 for molding a three-dimensional tire sipe.
Figure 7C:
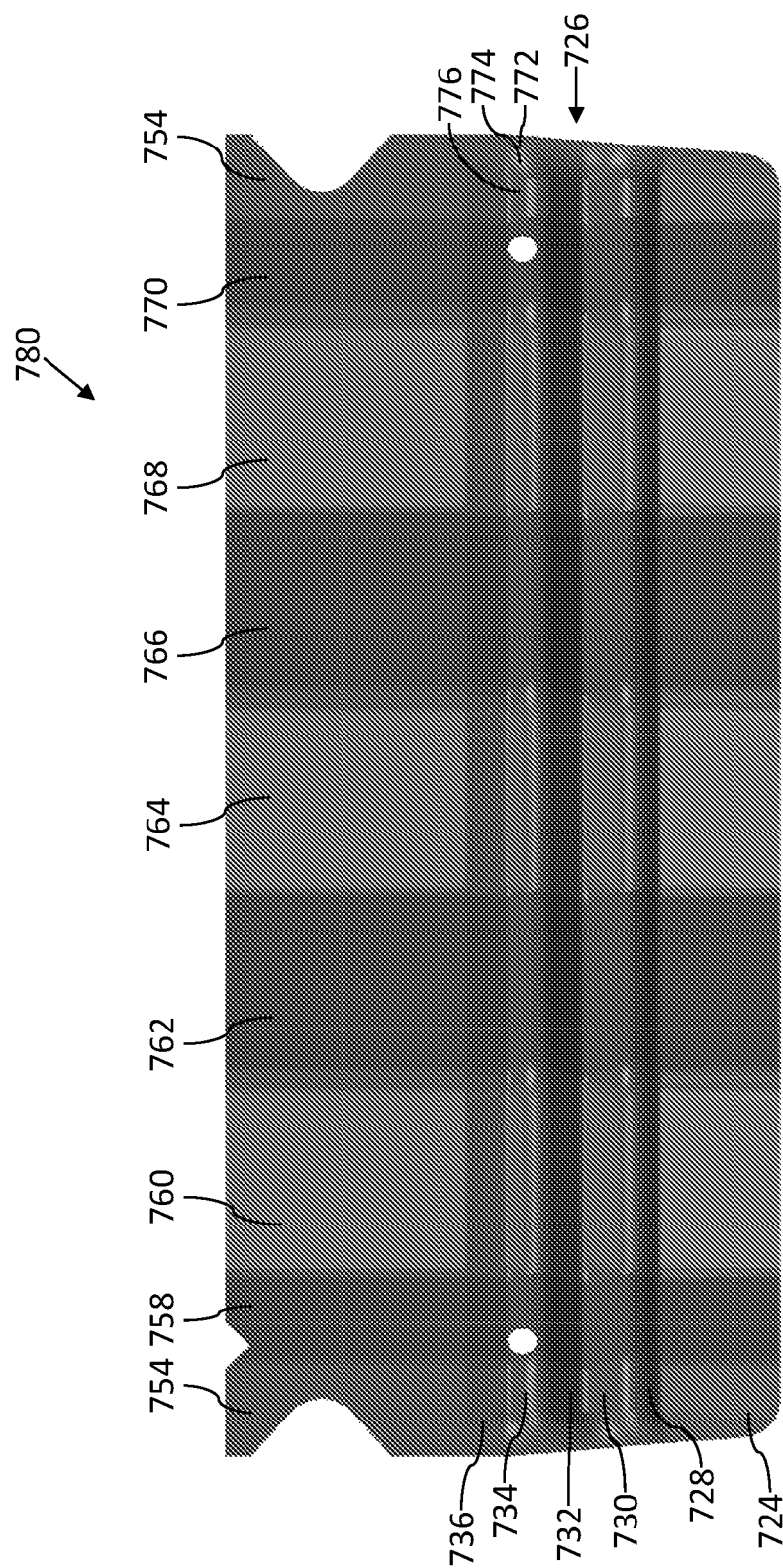
FIG. 7C illustrates a front elevational view of an example embodiment of tire sipe blade 780 for molding a three-dimensional tire sipe.
Figure 7D:
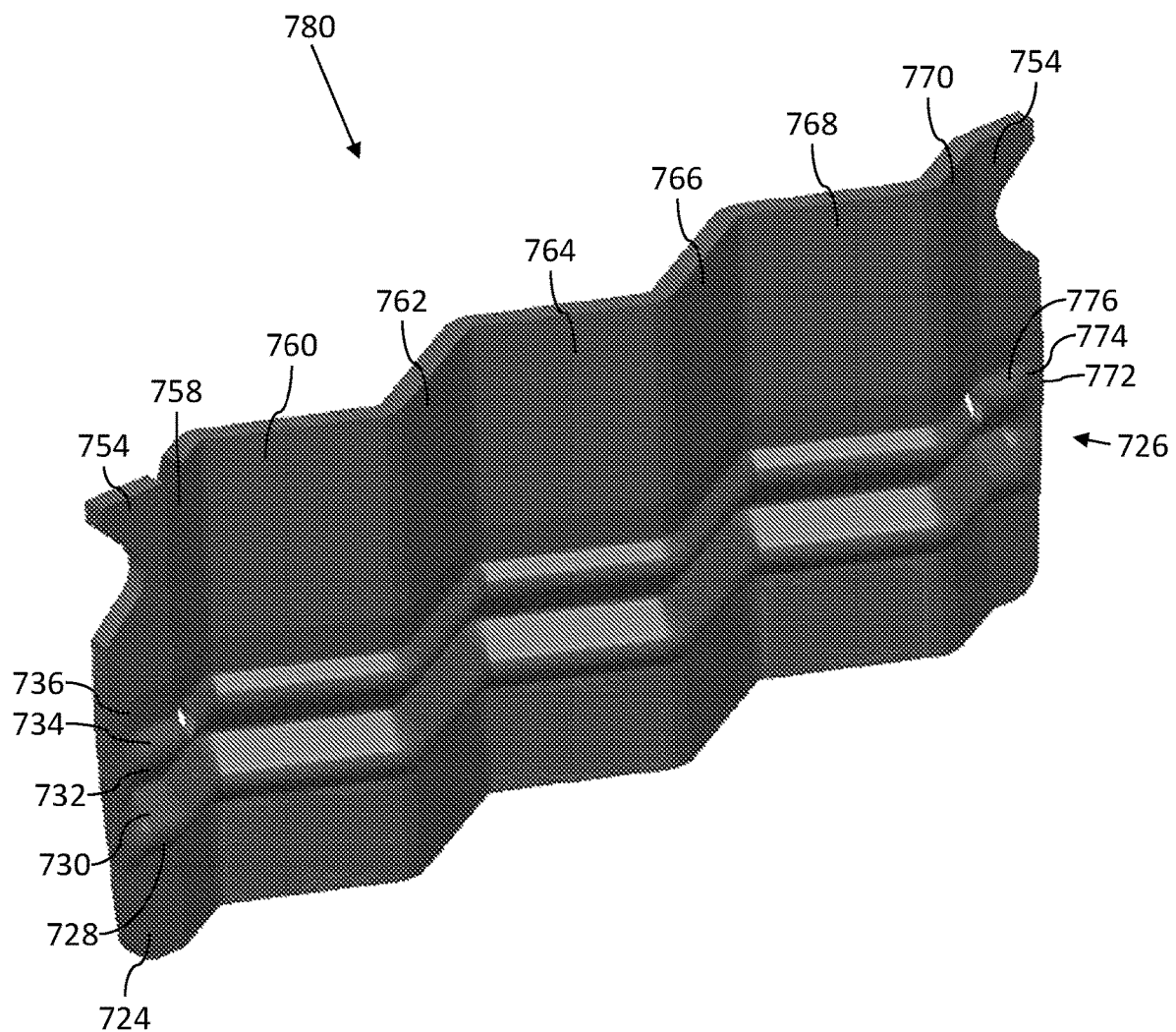
FIG. 7D illustrates a perspective view of an example embodiment of tire sipe blade 780 for molding a three-dimensional tire sipe.

FIG. 6 illustrates a partial perspective view of an example embodiment of a tire tread block 602 having at least one three-dimensional tire sipe 604. Tread block 602 may include a radially outermost block surface 620. Tread block 602 may include at least one block sidewall 622.

Tire sipe 604 may extend from at least one block sidewall 622. In one embodiment, tire sipe 604 may include a straight sipe zone 672 extending for a distance from block sidewall 622 into tread block 602. In straight sipe zone 672, tire sipe 604 may be void of any zig-zag features as it extends in the radial direction. That is, in straight sipe zone 672, tire sipe 604 may have the appearance of a standard radially-oriented sipe, but may begin to zig-zag in the radial direction as tire sipe 604 extends further into tread block 602 from block sidewall 622.

Tire sipe 604 may include two ends. At least one end of tire sipe 604 may extend to and/or open into an edge of tread block 602. The ends of tire sipe 604 may be the axially outermost portions of tire sipe 604, where tire sipe 604 is oriented substantially axially, partially axially, or axially. Straight sipe zone 672 may extend from an end of tire sipe 604. Straight sipe zone 672 may extend from an edge of tread block 602.

Straight sipe zone 672 may be any of a variety of lengths as may be desired in any of various designs of tire sipe 604. Straight sipe zone 672 may extend from block sidewall 622 into tread block 602 for a distance of about 1.00 mm. In another embodiment, straight sipe zone 672 may extend into tread block 602 between about 0.90 mm and about 1.10 mm. In another embodiment, straight sipe zone 672 may extend into tread block 602 between about 0.80 mm and about 1.20 mm. In another embodiment, straight sipe zone 672 may extend into tread block 602 between about 0.70 mm and about 1.30 mm. In another embodiment, straight sipe zone 672 may include a range comprising the lower and upper limits of any of the various ranges recited above, for example, a range between about 0.80 mm and about 1.30 mm.

A sipe transition zone 674 may extend into tread block 602 from straight sipe zone 672. A three-dimensional sipe zone 676 may extend from transition zone 674. In sipe transition zone 674, tire sipe 604 may transition from a straight sipe in straight sipe zone 672, to a three-dimensional zig-zag sipe in a three-dimensional sipe zone 676. Three-dimensional sipe zone 676 may include radially inner and radially outer tapered portions, as well as a sipe radially central portion comprising angled, zig-zag elements, all of which is illustrated in FIG. 3. Sipe transition zone 674 may represent a gradual transition between straight sipe zone 672 and three-dimensional sipe zone 676.

Sipe transition zone 674 may be any of a variety of lengths as may be desired in any of various designs of tire sipe 604. Sipe transition zone 674 may extend from straight sipe zone 672 into tread block 602 for a distance of about 1.00 mm. In another embodiment, sipe transition zone 674 may extend into tread block 602 between about 0.90 mm and about 1.10 mm. In another embodiment, sipe transition zone 674 may extend into tread block 602 between about 0.80 mm and about 1.20 mm. In another embodiment, sipe transition zone 674 may extend into tread block 602 between about 0.70 mm and about 1.30 mm. In another embodiment, sipe transition zone 674 may include a range comprising the lower and upper limits of any of the various ranges recited above, for example, a range between about 0.80 mm and about 1.30 mm.

As described above, three-dimensional sipe zone 676 is substantially similar in structure to tire sipe 304 illustrated in FIG. 3.

In one embodiment, tire sipe 604 has two or more ends that extend from two or more block sidewalls 622. Each end of tire sipe 604 may include a straight sipe zone 672, a sipe transition zone 674, and a three-dimensional sipe zone 676. Tire sipe 604 may include two ends, wherein each end of tire sipe 604 includes straight sipe zone 672, sipe transition zone 674 extending from straight sipe zone 672, and three-dimensional sipe zone 676 extending from sipe transition zone 674.

Straight sipe zone 672 may have any of a variety of thicknesses. Straight sipe zone 672 may have a thickness of about 0.60 mm. Straight sipe zone 672 may have a thickness of less than about 0.60 mm. Straight sipe zone 672 may have a thickness of more than about 0.60 mm. Three-dimensional sipe zone 676 may have a thickness of about 0.30 mm as described above. Three-dimensional sipe zone 676 may have a thickness of less than about 0.30 mm. Three-dimensional sipe zone 676 may have a thickness of more than about 0.30 mm. Transition zone 674 may have a thickness tapering from the thickness of straight sipe zone 672 to the thickness of three-dimensional sipe zone 676. In one embodiment, transition zone 674 may have a thickness tapering from about 0.60 mm to about 0.30 mm.

Tire sipe 604 may include a straight sipe zone 672, a sipe transition zone 674, and a three-dimensional sipe zone 676 to prevent tearing, fracture, or other destruction of the edges (where sipe 604 meets block sidewall 622) of tread block 602 in the area of tire sipe 604. Tire sipe 604 may include a straight sipe zone 672, a sipe transition zone 674, and a three-dimensional sipe zone 676 to improve the appearance and aesthetics of the laterally outer edge of tire sipe 604 (where tire sipe 604 meets block sidewall 622). Tire sipe 604 may include a straight sipe zone 672, a sipe transition zone 674, and a three-dimensional sipe zone 676 to stiffen and/or strengthen a tire sipe blade (not shown) used to mold tire sipe 604.

It is understood that any of tire sipes 104, 204, 304, 404, 504, and 604 may have a curved orientation relative to at least one of the longitudinal axis of the tire sipes, the radial direction of the tire, and the axial direction of the tire.

It is understood that any of tire sipes 104, 204, 304, 404, 504, and 604 may include a substantially planar, non-zigzagged portion extending from radially outermost block surface 120, 220, 320, 420, 520, and 620, with the three-dimensional zig-zag features illustrated in FIG. 3 as the sipe extends radially inward. That is, any of tire sipes 104, 204, 304, 404, 504, and 604 may appear similar to those sipes contained in shoulder rib 108 of FIG. 1 when viewed from the surface, but would appear similar to those sipes contained in FIGS. 3, 4, and 5 if the surface was cut away (along a plane parallel to the circumferential direction and axial direction) to reveal a sectional view of the tread block 102, 202, 302, 402, 502, or 602 radially below the outermost block surface.

FIGS. 7A, 7B, 7C, and 7D illustrate an example embodiment of a tire sipe blade 780 for molding a three-dimensional tire sipe (not shown). Sipe blade 780 may include various features that are the negative of features to be found in any of tire sipes 104, 204, 304, 404, 504, and 604 described above.

Sipe blade 780 may include a sipe radially central portion 726, which may include a first sipe radially angled portion 728, a second sipe radially angled portion 730, a third sipe radially angled portion 732, and a fourth sipe radially angled portion 734. The various angled portions may correspond to the angled portions described above with respect to FIG. 3.

Sipe blade 780 may include a radially inner sipe taper portion 724. Sipe blade 780 may include a radially outer sipe taper portion 736. Radially inner and radially outer sipe taper portions 724 and 736 may correspond to those taper portions described above with respect to FIG. 3. Radially outer sipe taper portion 736 may at least one of strengthen sipe blade 780 and stiffen sipe blade 780. Radially inner sipe taper portion 724 may at least one of strengthen sipe blade 780 and stiffen sipe blade 780. It is understood that designing sipe blade 780 with a thicker portion (e.g., radially outermost portion and/or radially innermost portion) may increase the strength and/or stiffness of sipe blade 780 so as to reduce the risk of deformation of sipe blade 780 during molding of a tire.

Sipe blade 780 may include a laterally outermost sipe portion 754. Laterally outermost sipe portion 754 may form all or part of the intersection between a sipe and a block sidewall. Sipe blade 780 may include two laterally outermost sipe portions 754.

Sipe blade 780 may include a sipe laterally central portion 756. Sipe laterally central portion 756 may include a plurality of inclined portions oriented in a zig-zag pattern. Sipe laterally central portion 756 may include a first sipe laterally angled portion 758, a second sipe laterally angled portion 760, a third sipe laterally angled portion 762, a fourth sipe laterally angled portion 764, a fifth sipe laterally angled portion 766, a sixth sipe laterally angled portion 768, and a seventh sipe laterally angled portion 770. The various sipe laterally angled portions may correspond to the sipe laterally angled portions described in FIGS. 4 and 5. It is understood that sipe blade 780 and sipe laterally central portion 756 may include any number of sipe laterally angled portions.

Sipe blade 780 may include one or more of a straight sipe zone 772, a sipe transition zone 774, and a three-dimensional sipe zone 776. Straight sipe zone 772, sipe transition zone 774, and three-dimensional sipe zone 776 may correspond to straight sipe zone 672, sipe transition zone 674, and three-dimensional sipe zone 676 illustrated in FIG. 6.

Figure 8:
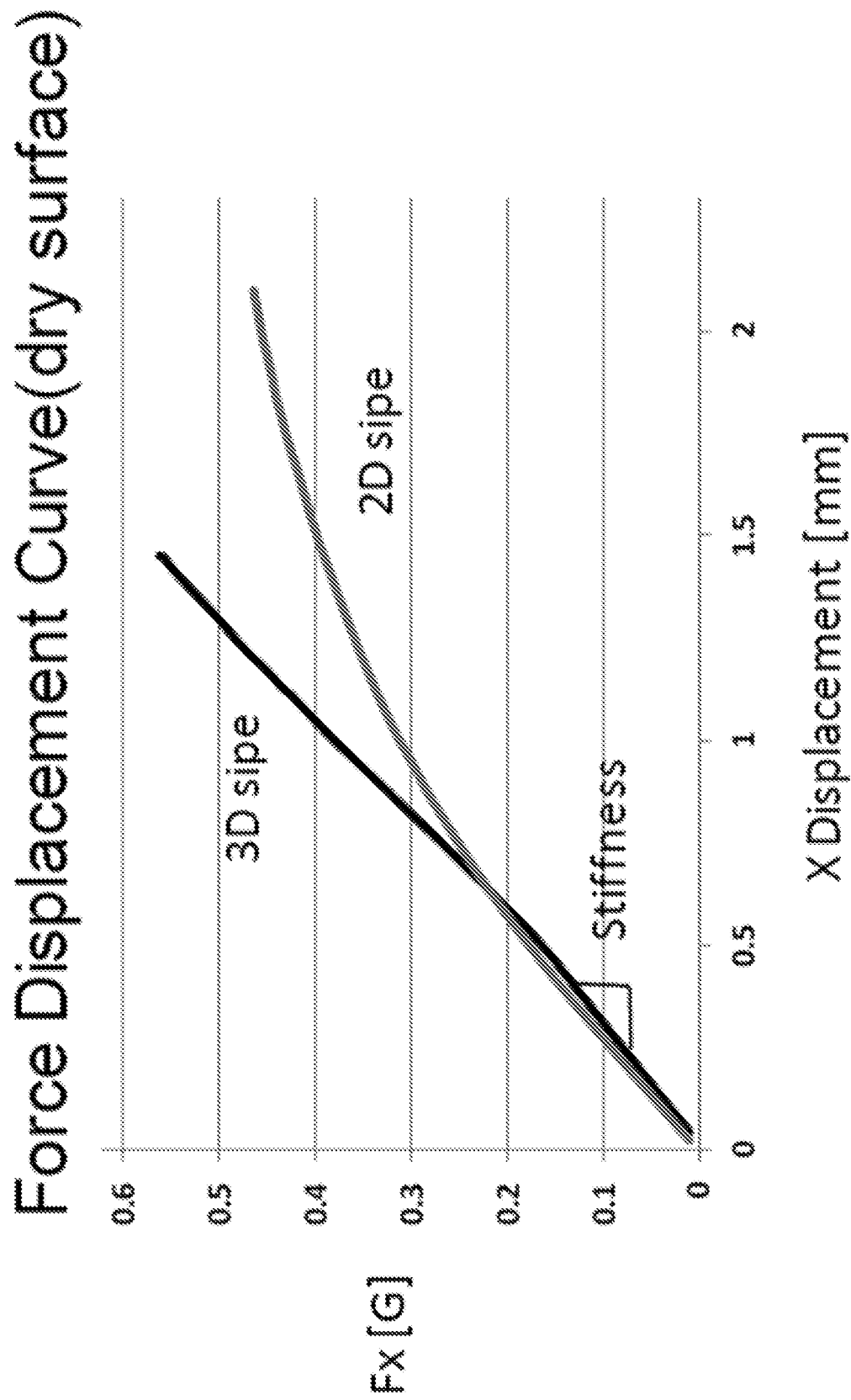
FIG. 8 illustrates a force-displacement curve for a tire tread block featuring a three-dimensional tire sipe versus a tire tread block featuring a two-dimensional tire sipe.

FIG. 8 illustrates a force-displacement curve for a tire tread block featuring a three-dimensional tire sipe versus a tire tread block featuring a two-dimensional tire sipe. As illustrated, the force-displacement curves illustrate the displacement of the radially outermost block surface on a tread block having a three-dimensional sipe, and a tread block having a two-dimensional sipe, across various force values.

The slope of each curve is representative of the stiffness of each tread block. As illustrated, the tread block having a three-dimensional sipe increases in stiffness under greater force. Additionally, the tread block having a three-dimensional sipe maintains a similar stiffness at a much greater force than the tread block having a two-dimensional sipe.

Figure 9:
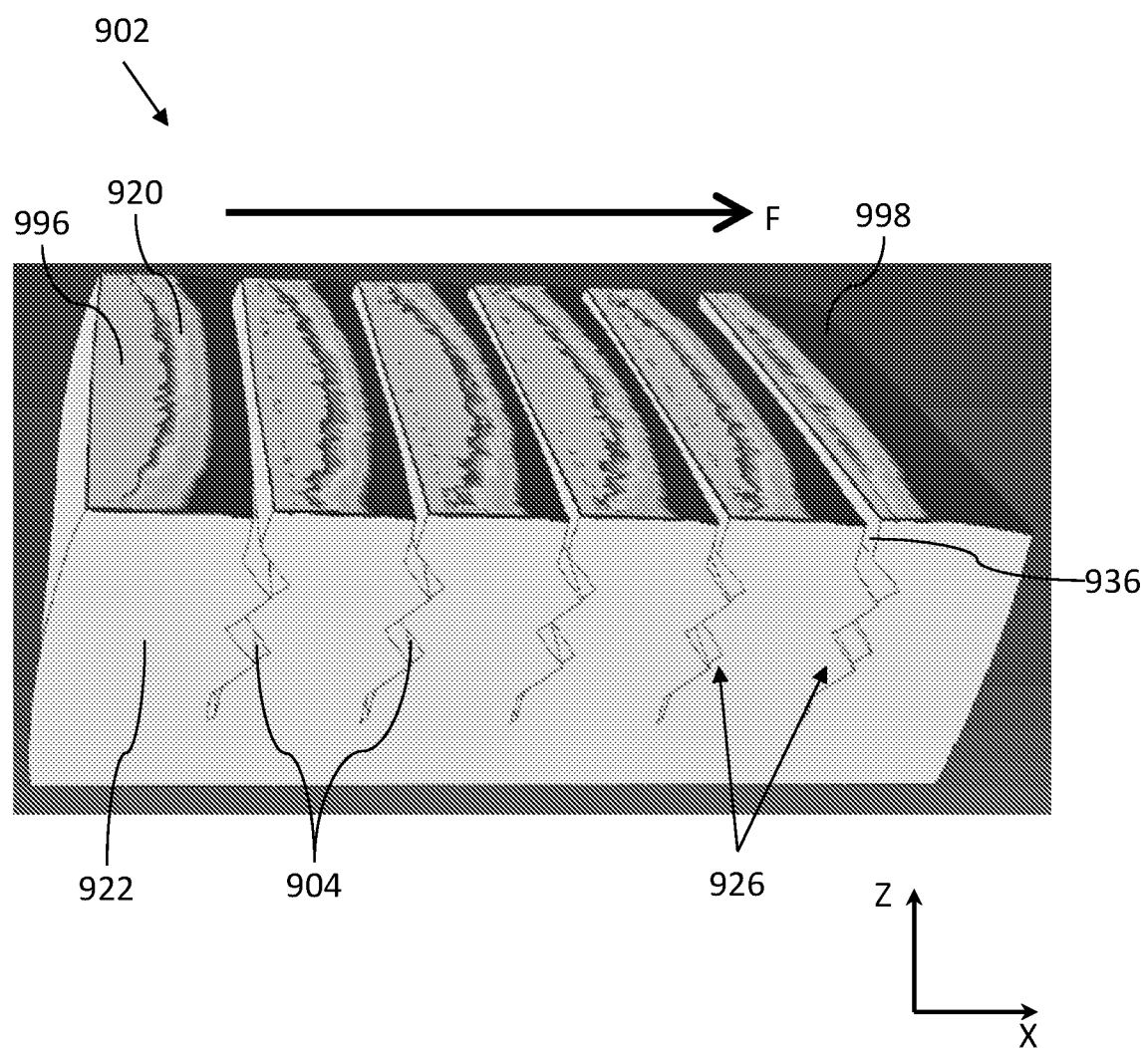
FIG. 9 illustrates a perspective view of an example embodiment of a tire tread block 902 having a three-dimensional tire sipe.

FIG. 9 illustrates a perspective view of an example embodiment of a tire tread block 902 having at least one three-dimensional tire sipe 904. Tread block 902 may include a radially outermost block surface 920 and at least one block sidewall 922.

Tire sipe 904 may include a sipe radially central portion 926 comprising a plurality of angled elements oriented in a zig-zag pattern. As illustrated, under the application of a shear force F, the portions of tread block 902 on either side of tire sipe 904 (through displacement of radially outermost block surface 920) may deflect, so as to cause a first side's angled portions to at least partially engage the second side's angled portions. Upon engagement between the first side and second side, the radially outermost block surface 920 may resist further displacement, thus maintaining and/or increasing stiffness of tread block 902.

Tire sipe 904 may include a radially outer sipe taper portion 936. As illustrated, during deflection of tread block 902, radially outer sipe taper portion 936 remains "open" such that the first side of tread block and the second side of tread block (bisected by tire sipe 904), remain spaced apart. Radially outer sipe taper portion 936 may be configured to remain open under deflection of tread block 902 of a tire to permit at least one of: increased edge engagement with roadway, introduction of snow into tire sipe 904, and introduction of a liquid (such as water) into tire sipe 904.

During deflection of tread block 902 of a tire under shear force F, at least one contact portion 996 may remain in contact with a roadway, while at least one liftoff portion 998 may lift out of contact with a roadway. As illustrated, tread block 902 may be broken into subportions separated by tire sipes 904. Each subportion may include a contact portion 996 and a liftoff portion 998. As illustrated, contact portion 996 of at least one subportion may be larger in area than liftoff portion 998. As such, tread block 902 as a whole may include a greater area in contact with a roadway than the area lifted out of contact from the roadway. As a result, at least one of traction, braking, and handling of a tire utilizing tread block 902 may be improved.

Figure 10:
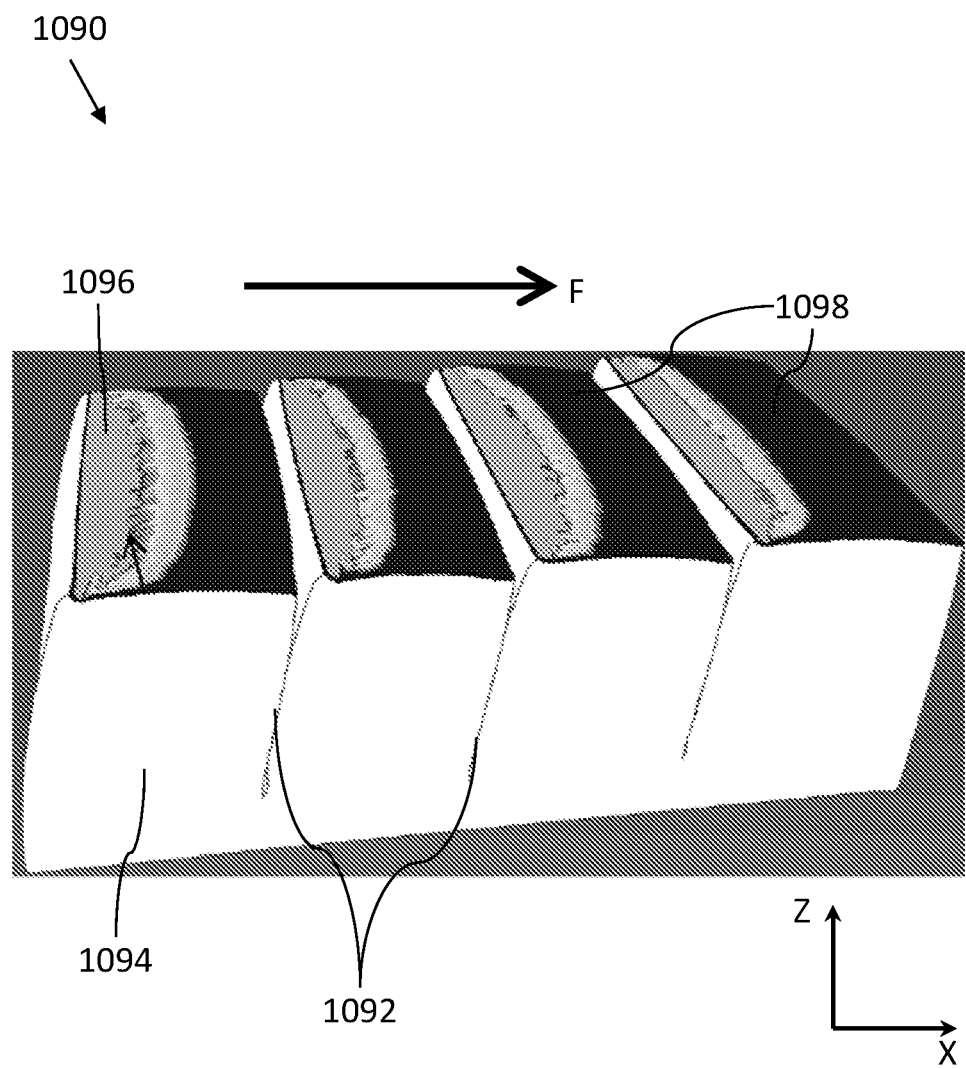
FIG. 10 illustrates a perspective view of a prior art tire tread block 1090 having a two-dimensional tire sipe.

FIG. 10 illustrates a perspective view of a prior art tire tread block 1090 having at least one two-dimensional tire sipe 1092. Two-dimensional tire sipes 1092 may extend into tread block 1090 from a block sidewall 1094.

As illustrated, tread block 1090 may be divided into subportions separated by two-dimensional tire sipes 1092. Upon the application of a shear force F to tread block 1090, the subportions may deflect, resulting in a contact portion 1096 and a liftoff portion 1098 in each subportion. As illustrated, contact portion 1096 may include an area about the same as, or even less than, liftoff portion 1098 within a subportion. As such, tread block 1090 as a whole may include a lesser area in contact with a roadway than the area lifted out of contact from the roadway. As a result, at least one of traction, braking, and handling of a tire utilizing tread block 1090 may be degraded relative to tread block 902 of FIG. 9.

Figure 11:
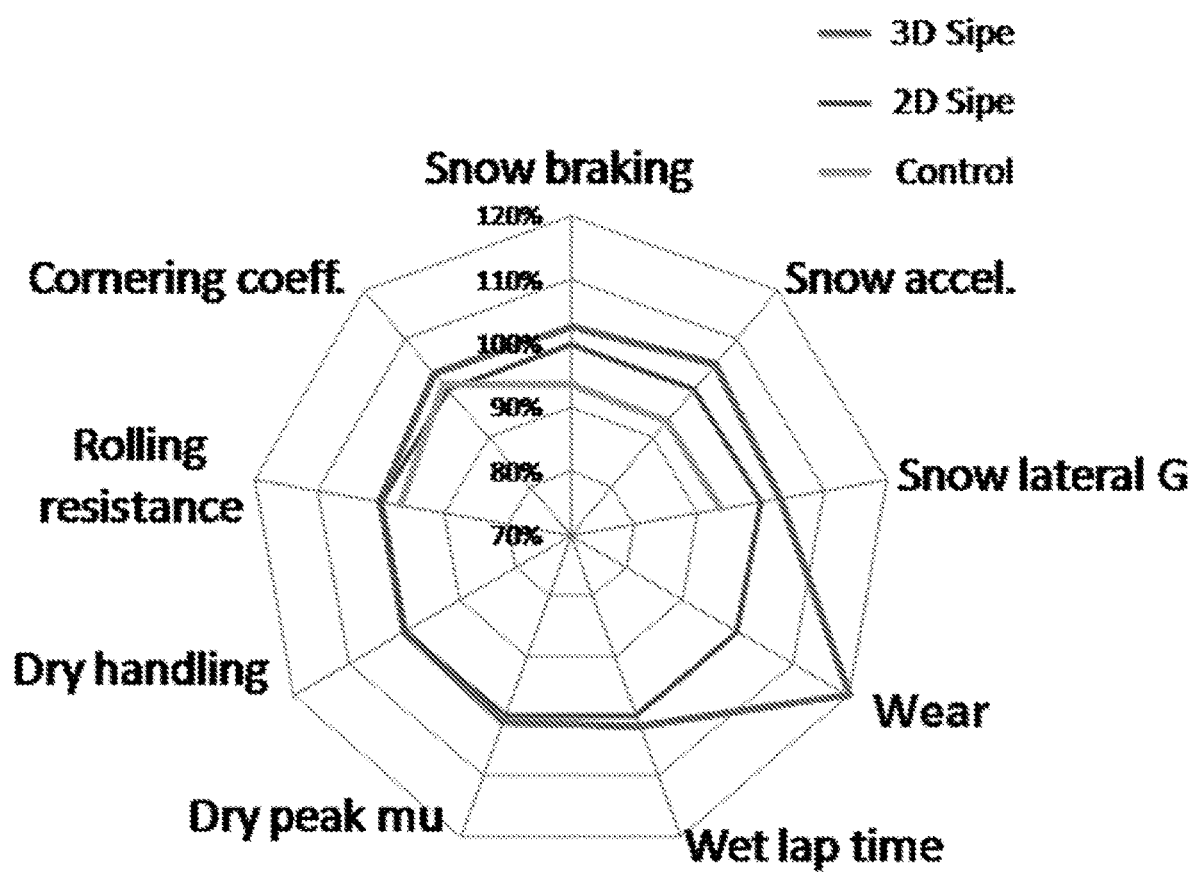
FIG. 11 illustrates a graph comparing various properties of a tire utilizing various tire sipe styles.

FIG. 11 illustrates a graph comparing various properties of a tire utilizing various tire sipe styles. As illustrated, the various properties of a tire utilizing three-dimensional tire sipes, particularly a three-dimensional tire sipe having a radially inner sipe taper portion and a radially outer sipe taper portion, performs at least as well and in many instances significantly better than a tire utilizing two-dimensional tire sipes and a control tire.

Specifically, a tire utilizing three-dimensional tire sipes performed better than both the control tire and a tire utilizing two-dimensional tire sipes in the following tests: cornering coefficient, snow braking, snow acceleration, snow lateral traction, tire wear, wet roadway lap time, and dry peak friction coefficient.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11. Cartesian coordinates referenced herein are intended to comply with the SAE tire coordinate system.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A tire tread comprising a sipe, comprising:
   a radially inner sipe taper portion having a radially innermost sipe width W3 and a radially inner sipe transition width W4,
      wherein the radially innermost sipe width W3 is greater than the radially inner sipe transition width W4;
   a radially outer sipe taper portion having a radially outer sipe width W1 and a radially outer sipe transition width W2,
      wherein the radially outer sipe width W1 is greater than the radially outer sipe transition width W2;
   a sipe radially central portion having a plurality of individual sipe radially angled portions oriented in a zig-zag pattern,
      wherein the sipe radially central portion is oriented radially between the radially inner sipe taper portion and the radially outer sipe taper portion, and
      wherein each of the sipe radially angled portions are oriented at an angle A1 relative to the circumferential direction of the tire, wherein the angle A1 is between 36 degrees and 54 degrees;
   wherein the sipe includes two laterally outer edges; and
   wherein each laterally outer edge of the tire sipe includes a straight sipe zone, a sipe transition zone extending from the straight sipe zone, and a three-dimensional sipe zone extending from the sipe transition zone.

2. The tire tread of claim 1, wherein:
   the tire sipe has a depth D1,
   the radially outer sipe taper portion has a depth D2, and
   the depth D2 is 15% of the depth D1.

3. The tire tread of claim 1, wherein:
   the tire sipe has a depth D1,
   the radially inner sipe taper portion has a depth D5, and
   the depth D5 is 40% of the depth D1.

4. The tire tread of claim 1, wherein the radially outer sipe taper portion is formed by two opposing inclined walls, wherein a first of the two opposing inclined walls is inclined in a first direction relative to a radial direction of the tire tread, wherein a second of the two opposing inclined walls is inclined in a second direction relative to the radial direction of the tire tread, and wherein the first direction and the second direction are opposite one another.

5. The tire tread of claim 1, wherein the radially inner sipe taper portion is formed by two opposing inclined walls, wherein a first of the two opposing inclined walls is inclined in a first direction relative to a radial direction of the tire tread, wherein a second of the two opposing inclined walls is inclined in a second direction relative to the radial direction of the tire tread, and wherein the first direction and the second direction are opposite one another.

6. The tire tread of claim 1, wherein the sipe includes two laterally outermost sipe portions that are parallel to a longitudinal axis of the sipe, and a laterally central portion between the two laterally outermost sipe portions, wherein the laterally central portion comprises a plurality of angled portions forming a zig-zag shape.

7. A tire tread comprising a sipe, comprising:
   a radially inner sipe taper portion having a radially innermost sipe width W3 and a radially inner sipe transition width W4,
      wherein the radially innermost sipe width W3 is greater than the radially inner sipe transition width W4;
   a sipe radially central portion having a plurality of individual sipe radially angled portions oriented in a zig-zag pattern,
      wherein the sipe radially central portion is oriented radially outwardly of the radially inner sipe taper portion, and
      wherein each of the sipe radially angled portions are oriented at an angle A1 relative to the circumferential direction of the tire, wherein the angle A1 is between 36 degrees and 54 degrees;
   wherein the sipe includes two laterally outer edges; and
   wherein each laterally outer edge of the tire sipe includes a straight sipe zone, a sipe transition zone extending from the straight sipe zone, and a three-dimensional sipe zone extending from the sipe transition zone.

8. The tire tread of claim 7, further comprising a radially outer sipe taper portion having a radially outer sipe width W1 and a radially outer sipe transition width W2,
wherein the radially outer sipe width W1 is greater than the radially outer sipe transition width W2, and
wherein the radially outer sipe taper portion is oriented radially outwardly of the sipe radially central portion.

9. The tire tread of claim 7, wherein:
the tire sipe has a depth D1,
the radially inner sipe taper portion has a depth D5, and the depth D5 is 40% of the depth D1.

10. The tire tread of claim 7, wherein the radially inner sipe taper portion is formed by two opposing inclined walls, wherein a first of the two opposing inclined walls is inclined in a first direction relative to a radial direction of the tire tread, wherein a second of the two opposing inclined walls is inclined in a second direction relative to the radial direction of the tire tread, and wherein the first direction and the second direction are opposite one another.

11. The tire tread of claim 7, wherein the sipe includes two laterally outermost sipe portions that are parallel to a longitudinal axis of the sipe, and a laterally central portion between the two laterally outermost sipe portions, wherein the laterally central portion comprises a plurality of angled portions forming a zig-zag shape.

12. The tire tread of claim 8, wherein:
the tire sipe has a depth D1,
the radially outer sipe taper portion has a depth D2, and the depth D2 is 15% of the depth D1.

13. The tire tread of claim 8, wherein the radially outer sipe taper portion is formed by two opposing inclined walls, wherein a first of the two opposing inclined walls is inclined in a first direction relative to a radial direction of the tire tread, wherein a second of the two opposing inclined walls is inclined in a second direction relative to the radial direction of the tire tread, and wherein the first direction and the second direction are opposite one another.

14. A tire tread comprising a sipe, comprising:
a radially outer sipe taper portion having a radially outer sipe width W1 and a radially outer sipe transition width W2,
wherein the radially outer sipe width W1 is greater than the radially outer sipe transition width W2;
wherein the radially outer sipe taper portion is formed by two opposing inclined walls;
wherein a first of the two opposing inclined walls is inclined in a first direction relative to a radial direction of the tire tread;
wherein a second of the two opposing inclined walls is inclined in a second direction relative to the radial direction of the tire tread; and
wherein the first direction and the second direction are opposite one another;
a sipe radially central portion having a plurality of individual sipe radially angled portions oriented in a zig-zag pattern,
wherein the sipe radially central portion is oriented radially inwardly of the radially outer sipe taper portion, and
wherein each of the sipe radially angled portions are oriented at an angle A1 relative to the circumferential direction of the tire, wherein the angle A1 is between 36 degrees and 54 degrees;
wherein the sipe includes two laterally outer edges; and
wherein each laterally outer edge of the tire sipe includes a straight sipe zone, a sipe transition zone extending from the straight sipe zone, and a three-dimensional sipe zone extending from the sipe transition zone.

15. The tire tread of claim 14, further comprising a radially inner sipe taper portion having a radially innermost sipe width W3 and a radially inner sipe transition width W4,
wherein the radially innermost sipe width W3 is greater than the radially inner sipe transition width W4, and
wherein the radially inner sipe taper portion is oriented radially inwardly of the sipe radially central portion.

16. The tire tread of claim 14, wherein:
the tire sipe has a depth D1,
the radially outer sipe taper portion has a depth D2, and the depth D2 is 15% of the depth D1.

17. The tire tread of claim 14, wherein the radially inner sipe taper portion is formed by two opposing inclined walls, wherein a first of the two opposing inclined walls is inclined in a first direction relative to a radial direction of the tire tread, wherein a second of the two opposing inclined walls is inclined in a second direction relative to the radial direction of the tire tread, and wherein the first direction and the second direction are opposite one another.

18. The tire tread of claim 14, wherein the sipe includes two laterally outermost sipe portions that are parallel to a longitudinal axis of the sipe, and a laterally central portion between the two laterally outermost sipe portions, wherein the laterally central portion comprises a plurality of angled portions forming a zig-zag shape.

19. The tire tread of claim 15, wherein:
the tire sipe has a depth D1,
the radially inner sipe taper portion has a depth D5, and the depth D5 is 40% of the depth D1.

* * * * *